(12) United States Patent
Ahmed et al.

(10) Patent No.: US 6,490,658 B1
(45) Date of Patent: *Dec. 3, 2002

(54) DATA PREFETCH TECHNIQUE USING PREFETCH CACHE, MICRO-TLB, AND HISTORY FILE

(75) Inventors: Sultan Ahmed, Santa Clara, CA (US); Joseph Chamdani, Santa Clara, CA (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/881,013

(22) Filed: Jun. 23, 1997

(51) Int. Cl.$^7$ ................................................ G06F 12/06
(52) U.S. Cl. ........................ 711/140; 711/137; 711/213; 712/207; 712/240; 712/237
(58) Field of Search ................................ 711/140, 137, 711/169, 204, 205, 207, 213, 120, 125, 122; 395/383, 584, 586, 587; 712/207, 237, 238, 239, 240

(56) References Cited

U.S. PATENT DOCUMENTS

| | | | | |
|---|---|---|---|---|
| 5,377,336 A | * | 12/1994 | Eikemeyer et al. | 711/213 |
| 5,404,467 A | * | 4/1995 | Saba et al. | 712/207 |
| 5,412,787 A | * | 5/1995 | Forsyth et al. | 711/207 |
| 5,437,017 A | * | 7/1995 | Moore et al. | 711/141 |
| 5,463,750 A | * | 10/1995 | Sachs | 711/206 |
| 5,500,948 A | * | 3/1996 | Hinton et al. | 711/205 |
| 5,566,324 A | * | 10/1996 | Kass | 711/204 |
| 5,778,423 A | * | 7/1998 | Sites et al. | 711/118 |
| 5,796,971 A | * | 8/1998 | Emberson | 711/122 |
| 5,918,245 A | * | 6/1999 | Yung | 711/122 |
| 5,935,241 A | * | 8/1999 | Shiell et al. | 712/240 |
| 5,946,718 A | * | 8/1999 | Green | 711/207 |
| 5,953,748 A | * | 9/1999 | Riordan | 711/207 |
| 5,960,463 A | * | 9/1999 | Sharma et al. | 711/206 |
| 5,963,984 A | * | 10/1999 | Garibay, Jr. et al. | 711/206 |
| 6,119,222 A | * | 9/2000 | Shiell et al. | 712/238 |
| 6,209,020 B1 | * | 3/2001 | Angle et al. | 711/140 |

OTHER PUBLICATIONS

S. VanderWiel et al., "A Survey of Data Prefetching Techniques," submitted to *IEEE Computer publication*, pp. 1–26.

J. Baer et al. "An Effective On–Chip Preloading Scheme to Reduce Data Access Penalty," *Proceedings of Supercomputing '91*, pp. 176–186 ( Nov. 1991).

(List continued on next page.)

*Primary Examiner*—Matthew Kim
*Assistant Examiner*—Pierre-Michel Bataille
(74) *Attorney, Agent, or Firm*—Townsend and Townsend and Crew LLP

(57) ABSTRACT

A memory cache method and apparatus with two memory execution pipelines, each having a translation lookaside buffer (TLB). Memory instructions are executed in the first pipeline (324) by searching a data cache (310) and a prefetch cache (320). A large data TLB (330) provides memory for storing address translations for the first pipeline (324) A second pipeline (328) executes memory instructions by accessing the prefetch cache (320). A second micro-TLB (340) is associated with the second pipeline (328). It is loaded in anticipation of data that will be referenced by the second pipeline (328). A history file (360) is also provided to retain information on previous instructions to aid in deciding when to prefetch data. Prefetch logic (370) determines when to prefetch data, and steering logic (380) routes certain instructions to the second pipeline (328) to increase system performance.

34 Claims, 5 Drawing Sheets

OTHER PUBLICATIONS

R.L. Lee, "The Effectiveness of Cache and Data Prefetch Buffers in Large–Scale Shared Memory Multiprocessors," *Ph.D. Thesis, Dept. of Computer Science, University of Illinois at Urbana–Champaign*, pp. 1–140 (May 1987).

Todd C. Mowry, "Tolerating Latency Through Software–Controlled Data Prefetching," Ph.D. Thesis, Stanford University, Mar. 1994.

Farkas, Keith I., Norman P. Jouppi, and Paul Chow, "How Useful Are Non–Blocking Loads, Stream Buffers and Speculative Execution in Multiple Issue Processors?", High– Performance Computer Architecture Symposium, pp. 78–89. 1995.*

Chen, Tien–Fu and Jean–Loup Baer, "Effective Hardware–Based Data Prefetching for High–Performance Processors," IEEE Transactions on Computers, vol. 44, No. 5, May 1995, pp. 609–623.*

D. Calahan et al., "Software Prefetching," Proceedings of the 4th International Conference on ASPLOS, Santa Clara, CA, pp. 40–52 (Apr. 1991).*

"Cache Line Prefetch for Translations with Hashed Page Table", IBM technical Disclosure Bulletin, vol. 37, No. 11, Nov. 1994.*

"Use of a Small L2 as a Prefetch Buffer", IBM technical Disclosure Bulletin, vol. 29 No. 9, Feb. 1987.*

"Second Level Cache with Compact Directory", IBM technical Disclosure Bulletin, vol. 37, No. 11, Nov. 1994.*

Hybrid Compiler/Hardware Prefetching for Multiprocessors Using Low–Overhead cache Miss Traps, Skeppstedt et al., IEEE Transactions, pp. 298–305, 1997.*

Branch–Directed and Stribe–Based Data Cache Prefetching, Liu et al., IEEE Transactions, pp. 225–230, 1996.*

* cited by examiner

| Micro - TLB | | |
|---|---|---|
| Virtual Address | Physical Address | Attributes |

FIG. 4

| History File | | | | | | | | | |
|---|---|---|---|---|---|---|---|---|---|
| Valid | PC | Load - EA | Stride | P-cache Line Valid | P-cache Line Index | P-cache Line Hits | Load PC Hits | Don't Steer | Loop Size |

DATA PREFETCH TECHNIQUE USING PREFETCH CACHE, MICRO-TLB, AND HISTORY FILE

BACKGROUND OF THE INVENTION

The present invention relates generally to the field of data cache memories, and more specifically to an apparatus and method for prefetching data into a cache memory.

The recent trend in computer systems has been toward faster and more efficient microprocessors. However, the speed with which the processors are able to access their related memory devices has not increased at the same rate as the processors' execution speed. Consequently, memory access delays have become a bottleneck to increasing overall system performance.

Generally, the faster data can be retrieved from a memory device, the more expensive the device is per unit of storage. Due to this cost, it is not feasible to have enough register (i.e., fast memory device) capacity in the microprocessor's on-chip main memory to hold all of the program instructions and data needed for many applications. Consequently, most of the data and instructions are kept on large, relatively slow storage devices. Only the instructions and data that are currently needed are brought into registers.

To reduce the time it takes to retrieve data from the slower bulk storage memories, specialized memories are placed between the registers and the bulk storage devices. These memories are known as cache memories in the industry. Cache memories exploit the "principle of locality," which holds that all programs favor a particular segment of their address space at any instant in time. This hypothesis has two dimensions. First, locality can be viewed in time (temporal locality,) meaning that if an item is referenced, it will tend to be referenced again soon. Second, locality can be viewed as locality in space (spatial locality,) meaning that if an item is referenced, nearby items will also tend to be referenced. By bringing a block or subblock of data into the cache when it is referenced, the system can take advantage of both of these principles to reduce the time it takes to access the data the next time it is referenced.

Data may be brought into the cache as it is requested, or sometimes before it is requested. If data is brought into the cache memory before it is requested, it is said to be "prefetched." Prefetching may be initiated by software or hardware. In software prefetching, the compiler inserts specific prefetch instructions at compile time. The memory system retrieves the requested data into the cache memory when it receives a software prefetch instruction, just as it would for a normal memory request. However, nothing is done with the data beyond that point until another software instruction references the data.

Hardware prefetching dynamically decides during operation of the software which data will most likely be needed in the future, and prefetches it without software intervention. If it makes the correct decision on what data to prefetch, the data is ready when the software requests it. Decisions on when to prefetch are often made with the assistance of a history buffer. A history buffer retains information related to individual software instructions. It maintains a set of entries cataloguing what has taken place in previous iterations of the instructions.

Each method has its advantages and disadvantages. Software is often more efficient in deciding when to prefetch data. However, extra instruction cycles are required to execute the prefetch instructions. On the other hand, hardware may make more mistakes in deciding when to prefetch, but does not require the extra instruction cycles. Hardware prefetching is also often advantageous to speed up old codes/binaries that were not compiled with software prefetching.

Another architectural feature implemented in some of today's microprocessor architectures is the use of multiple caches. FIG. 1 is a diagram showing some previously known uses of multiple caches in a memory system 105. A processor 110 is connected to registers within a main memory 120. Processor 110 has direct access to the registers. If an instruction or data is needed by processor 110, it is loaded into the registers from a storage device 125.

Multiple caches may be placed between storage device 125 and main memory 120 in a variety of ways. For example, two caches may be placed hierarchically. In modern processors, it is common to have a first level of cache, L1 cache 140, on the same integrated circuit as the processor and main memory 120. A second level of cache, L2 cache 150, is commonly located between L1 cache 140 and storage device 125. Generally, L1 cache 140 is more quickly accessible than L2 cache 150 because they reside on the same integrated circuit.

Another way that multiple cache systems are implemented is with parallel caches. This allows multiple memory operations to be done simultaneously. A second cache, L1 cache 142, is located in parallel with L1 cache 140 at the first level. In some applications, L1 cache 142 is a specialized cache for fetching a certain type of data. For example, first L1 cache 140 may be used to fetch data, and second L1 cache 142 may be used to fetch instructions. Alternatively, second L1 cache 142 may be used for data that is referenced by certain instruction that commonly reuse the same data repeatedly throughout a calculation. This often occurs with floating point or graphics operations.

Another approach for using parallel caches is taught in commonly assigned U.S. Pat. No. 5,898,852, issued Apr. 27, 1999 entitled "Load Steering for Dual Data Cache", which is incorporated herein by reference for all purposes. It teaches the use of first L1 cache 140 as a standard data cache and second L1 cache 142 as a prefetch cache for prefetching data as described above.

Additional hardware features may also be included in a cache system to increase the performance of the system. A translation lookaside buffer (TLB) 160 may be added to speed up the access to storage device 125 in the case of a cache miss. Generally, processor 110 references an item of data by a virtual address. A line of data in the cache may be referenced by a tag that is related to the virtual address. However, the data is stored on storage device 125 according to a physical address. If a cache miss occurs, a translation must be done by cache miss handling logic (not shown) to calculate the physical address from the virtual address. This translation may take several clock cycles and cause a performance penalty. TLB 160 is used to hold a list of virtual to physical translations, and if the translation is found in the TLB, time is saved in subsequent accesses to the same data.

A limitation of currently available devices is that an instruction directed toward a parallel cache, such as L1 cache 142, that causes a cache miss causes significant delays. These delays occur because the instruction must be recycled to the main cache system for determining the physical address.

Consequently, it is desirable to provide an improved apparatus and method for implementing parallel caches that reduces the instances that instruction recycling must occur, and for deciding when and what type of instructions to send to the parallel cache. Further, it is desirable to provide an improved architecture and method for prefetching data into a cache memory.

SUMMARY OF THE INVENTION

An improved data cache system for retrieving data requested by a processor from a memory system is disclosed. The data cache system includes a prefetch cache for storing data before it is referenced by a memory instruction, a prefetch pipeline for selectively executing the memory instruction by accessing the prefetch cache, a translation lookaside buffer (TLB) for storing a translation from a virtual addresses to a physical address for data referenced by the memory instruction before the memory instruction is executed, and a prefetch logic block for selectively determining when and what type of data to store in the prefetch cache. A history file maintains a record of historical information regarding a particular memory instruction. Also, a steering logic block is included for determining when and what type of data to direct to the prefetch pipeline.

The steering logic block steers instructions to the prefetch pipeline based on information in the history file. Translations are loaded into the TLB in anticipation of instructions being steered to the prefetch pipeline. The prefetch logic block can operate in various modes that determine when and what type of data to prefetch based on whether a hit is found to the prefetch cache, the TLB, or the history file. Prefetching may also be instigated by software command.

Further features of the invention, its nature and various advantages will be more apparent from the accompanying drawings and the following detailed description of the specific embodiments.

BRIEF DESCRIPTION OF THE DRAWINGS

FIG. 4 depicts a micro translation lookaside buffer (micro-TLB); and

FIG. 5 depicts a history file.

DESCRIPTION OF THE SPECIFIC EMBODIMENT

Figure 1:
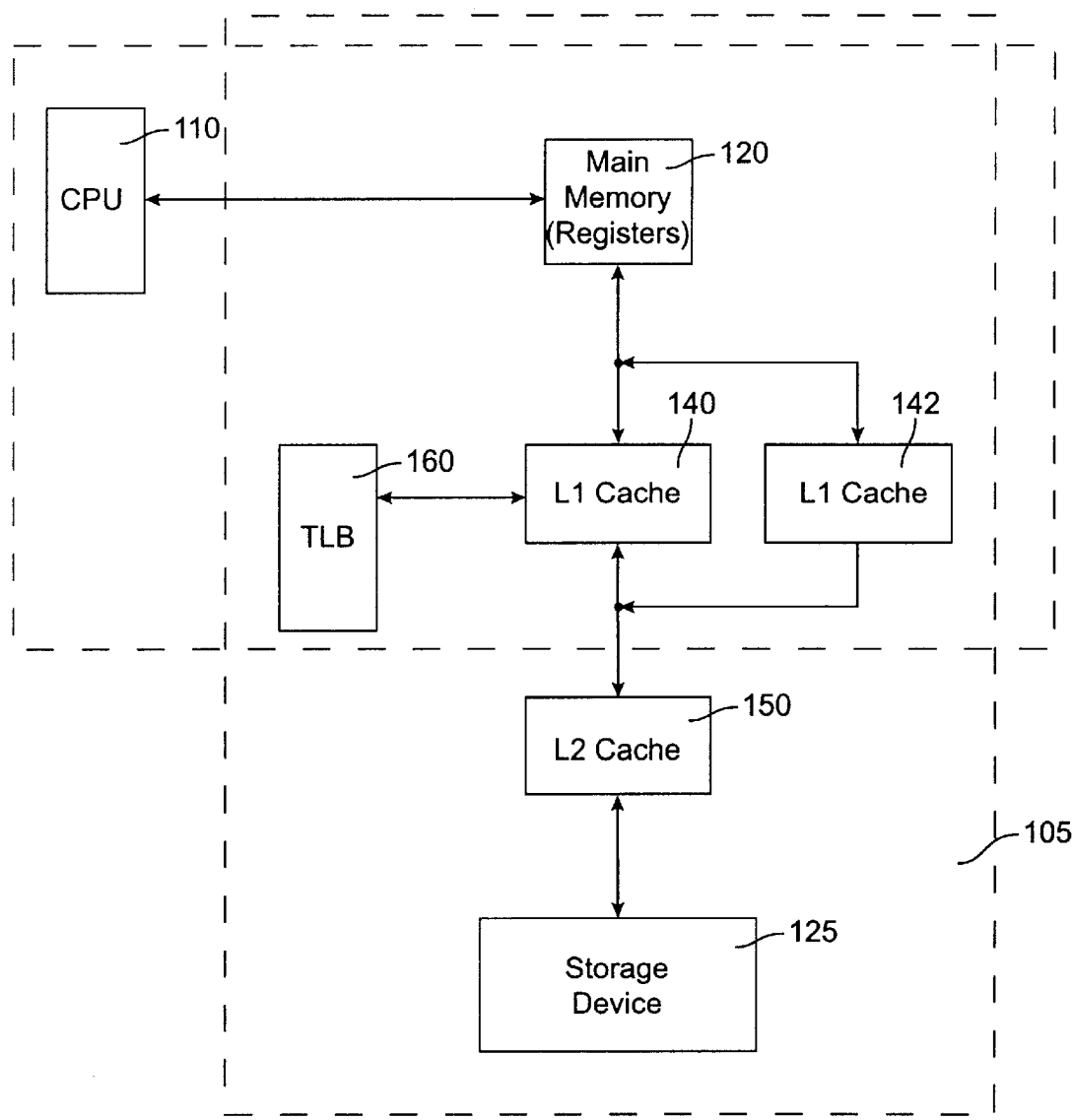
FIG. 1 is a block diagram of a hierarchical memory system.
Figure 2:
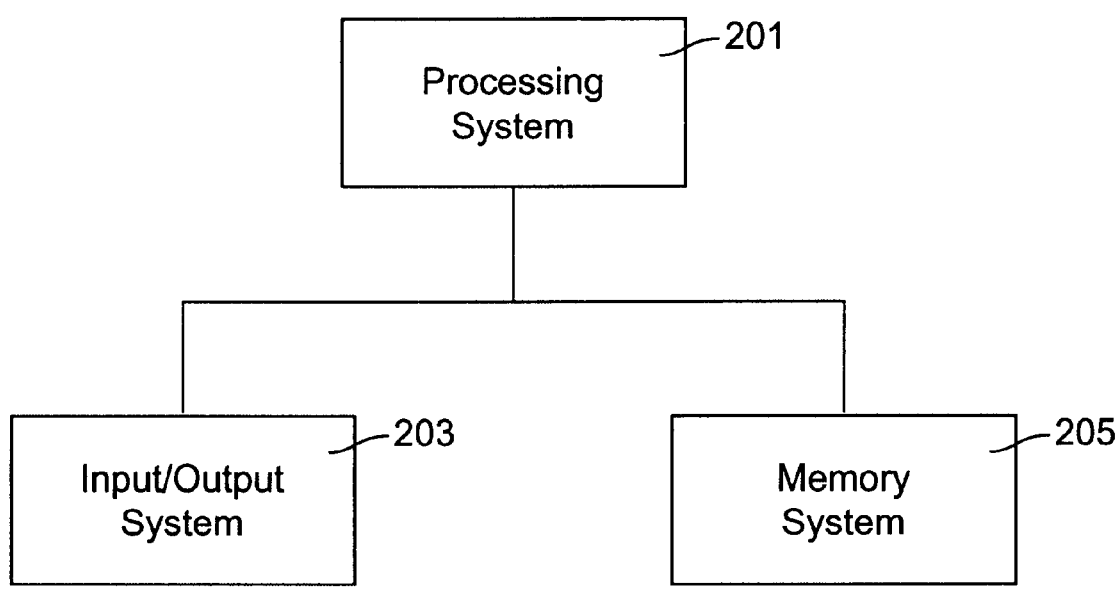
FIG. 2 is a block diagram of a digital system upon which the present invention may be implemented.

FIG. 2 depicts a simplified block diagram of a typical digital system. A processing system 201 is coupled with an input/output system 203 and a memory system 205. Processing system 201 may include one or more processors which operate on software instructions. The software instructions are generally held in memory system 205, along with data used by the digital system. Although shown as a single block, memory system 205 may include one or more different types of memories, for example, flip-flops, SRAMs, DRAMs, floppy disks, hard disks, CDROMS, tapes, tape cartridges, etc. Other types of memory, now known or later conceived may be included in memory system 205. Each processor of processor system 201 may have memory system 105 dedicated solely to it, or multiple processors may share a single memory system 105 in common.

Data and user-commands may be input or output from the digital system with input/output system 203. Input/output system 203 may include printers, keyboards, displays, I/O ports, scanners, network adapters, speakers, mouses, trackballs, or other input/output devices.

Figure 3:
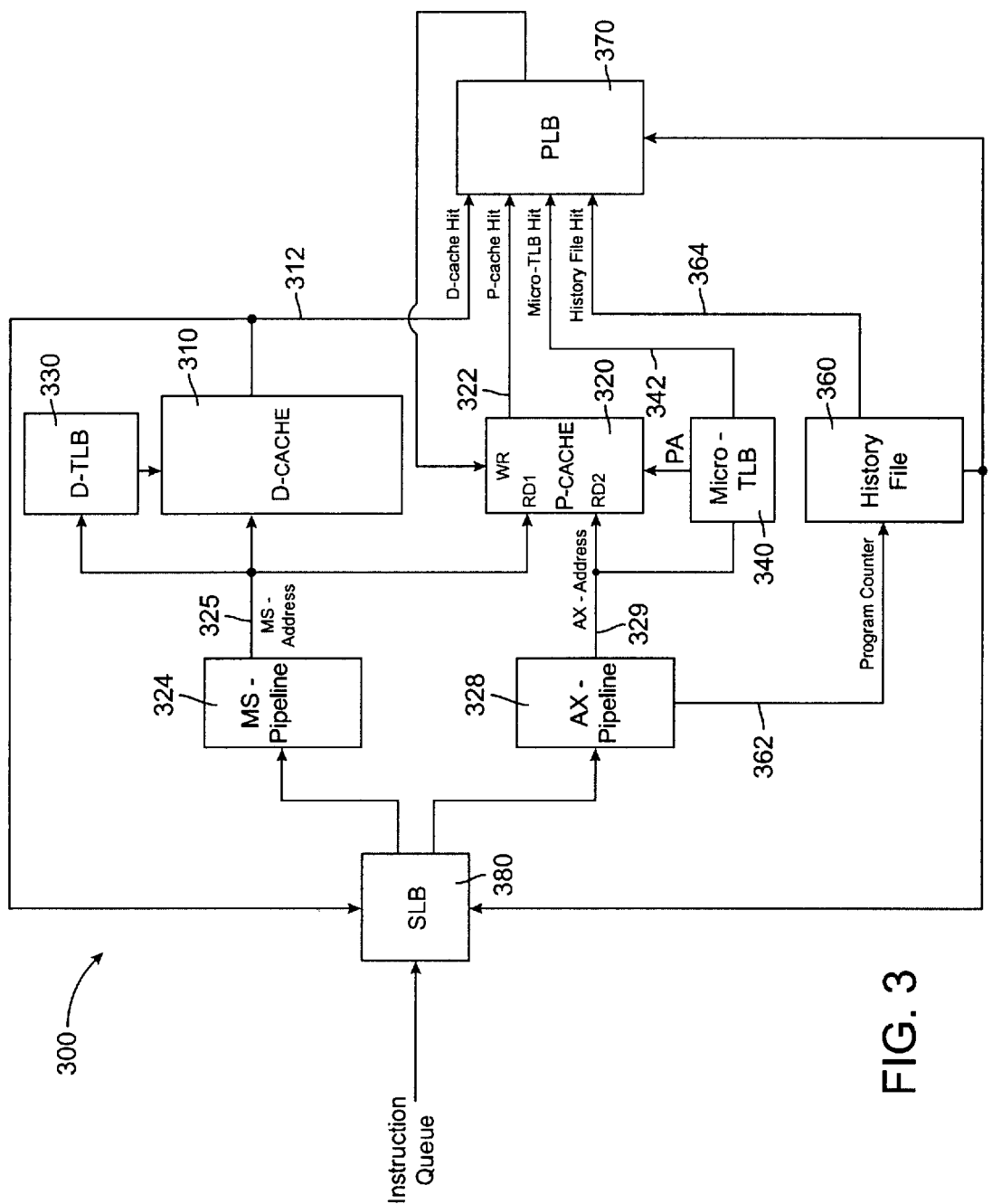
FIG. 3 is a block diagram of a cache memory system of the present invention.

FIG. 3 is a block diagram of a cache memory system 300 of the present invention. One or more cache memory systems 300 may be included in memory system 205 of FIG. 2. Only those structures and data paths necessary to describe the present invention are shown in FIG. 3. Typically, memory system 205 is connected to one or more processors and includes a main memory with registers for the use by the processor. These elements are not shown in FIG. 3 for simplicity. A fully functional system would contain many more functional units, data paths, glue logic, and similar architectural units. The system shown in FIG. 3 is for illustrative purposes and is intended only to provide a possible framework in which the method and apparatus of the present invention might be practiced.

Referring to FIG. 3, two cache memories are provided. They include a data cache (D-cache) 310 and a prefetch cache (P-cache) 320. Typically, D-cache 310 and P-cache 320 are L1 level caches. In the specific embodiment, D-cache 310 is a 64-kilobyte, four-way set associative cache and P-cache 320 is a two-kilobyte, four-way set associative cache. Of course, these sizes and specifications are intended only as an example of the specific embodiment. Other sizes and types of cache devices may be used as the application warrants. For example, they may be fully-associative or direct mapped caches.

D-cache 310 may be a typical on-demand cache memory operating as is well known in the art. That is, data is loaded into D-cache 310 whenever it is referenced by a memory instruction. When data is referenced, D-cache 310 is searched. If the data is found within D-cache 310, it is transferred from there to a register file (not shown), which is a collection of registers for holding data in the main memory and a D-cache hit is communicated on a D-cache hit line 312. If it is not found in D-cache 310, then it is fetched from an external memory and loaded into D-cache 310 at that time.

P-cache 320, on the other hand, is a different type of cache. It is accessed in the same manner as D-cache 310, but differs in the way data is stored therein. When a memory instruction references data, P-cache 320 is searched. If the data is found in P-cache 320, it is transferred to the register file and a P-cache hit is communicated on a P-cache hit line 322. If the data is not found in P-cache 320, it is not loaded into P-cache 320 at that time. Instead, specialized logic speculatively loads P-cache 320 with data in anticipation of the data being later referenced by a memory instruction. The prefetching may be initiated by a software instruction, or it may be initiated by hardware. The specialized logic and techniques will be discussed in more detail below with respect to prefetch logic block 370.

In the specific embodiment, cache memory system 300 has two separate execution pipelines. They operate on memory instructions from the processor. The first pipeline is a Memory/Special (MS) pipeline 324. It accesses data in both D-cache 310 and P-cache 320 by presenting an address on MS address lines 325. It locates the data in D-cache 310, P-cache 320, or an external memory unit (not shown) and causes it to be written to the register file. When a memory instruction requests data, MS-pipeline 324 searches D-cache 310 and P-cache 320 to find the data. If the data is found within D-cache 310 or P-cache 320, the data is transferred from there to the register file. If the data is not found within either D-cache 310 or P-cache 320, the data is fetched from a storage device lower in the memory hierarchy for transfer to the register file. At that time, a line containing the referenced data is stored in D-cache 310 and P-cache 320.

A second pipeline (AX-pipeline 328) accesses only P-cache 320 by placing an address on AX address lines 329. If a P-cache hit occurs, then the data is transferred to the register file. If there is no P-cache hit, the data is retrieved from another memory device. Details of how this is done are described below. Preferably, AX-pipeline 328 operates on memory instructions that have a good likelihood of causing a P-cache hit. Instructions are steered to AX-pipeline 328 based on criteria that will be discussed below. Since both MS-pipeline 324 and AX-pipeline 328 have access to P-cache 320, it has two read ports. D-cache 310, on the other hand, has only one read port.

A translation lookaside buffer (D-TLB) 330 is associated with D-cache 310. D-TLB 330 is a typical translation lookaside buffer as is known in the art. It contains translations from virtual addresses to physical addresses for memory locations that have previously been brought into D-cache 310. Typically, D-TLB 330 is a very large buffer. When a cache miss occurs in D-cache 310, MS-pipeline 324 checks D-TLB 330 to see if the virtual address translation is in the buffer. If it is in the buffer, then the physical address can be retrieved. If it is not, then a page miss interrupt handler (hereinafter miss handler) performs the translation and places an entry into D-TLB 330. The miss handler takes time, and therefore, system performance is better if the translation is found in D-TLB 330.

A second translation lookaside buffer, a micro-TLB 340, is associated with AX-pipeline 328. Micro-TLB 340 is a smaller, more compact and quickly accessible version of D-TLB 330. It contains virtual-to-physical address translations and may be addressable by the virtual address. FIG. 4 is a depiction of the format for micro-TLB 340 in the specific embodiment. It contains several lines, each line having a virtual address, the corresponding physical address, and attributes. The attributes, as previously specified, may include a valid bit that indicates whether the data on that particular line is valid. Other relevant information may be included in the attributes field as warranted by the application.

Micro-TLB 340 may be loaded with addresses that are predicted to be referenced by instructions in AX-pipeline 328. For example, in one mode of the specific embodiment (discussed below,) the first iteration of a floating point load instruction is executed in MS-pipeline 324. Subsequent executions of the floating point load instruction are steered to AX-pipeline 328. Consequently, it can be predicted on the first occurrence of a floating point load instruction in MS-pipeline 324 that the next occurrence of that instruction will be steered to AX-pipeline 328. So, when this situation is detected, MS-pipeline stores the virtual-to-physical translation in micro-TLB 340 when it is made available by the miss handler.

By intelligently anticipating the instructions that will be steered to AX-pipeline 328, micro-TLB can be kept full of those translations that are likely to be steered to AX-pipeline 328. If during its operation, AX-pipeline 328 encounters a miss to micro-TLB 340, subsequent instances of that instruction are steered to MS-pipeline 324. Other modes of operation for determining when to steer instructions to AX-pipeline 324 will be discussed below. The present invention allows for micro-TLB to be loaded based upon whatever criteria is used for steering instructions.

An advantage of including micro-TLB 340 in the architecture is that it is quickly accessible by AX-pipeline 328 and may be accessed independently of MS-pipeline 324. Furthermore, even if AX-pipeline 328 experiences a P-cache 320 miss, if micro-TLB 340 contains the translation information, time is saved by avoiding having to recycle the instruction back through MS-pipeline 324 to obtain the physical address and retrieve the data.

When AX-pipeline 328 accesses a particular virtual address, a virtual address is presented to both micro-TLB 340 and P-cache 320 simultaneously. If a hit occurs to micro-TLB 340, it is communicated on a micro-TLB hit line 342. P-cache 320 is indexed by a portion of the virtual address, and tagged by a portion of the physical address. If there is a hit to micro-TLB 340, the physical address entry is compared with the physical addresses in P-cache 320 indexed by the virtual address. If there is a match, then a P-cache hit is communicated on P-cache hit line 322. If there is no match, then it is a P-cache miss.

If there is a hit to micro-TLB 340, then the miss handler routine does not have to be invoked. In the specific embodiment, the instruction must be recycled to MS-pipeline 324 when a micro-TLB miss occurs. However, this will happen less often than it did in prior art system, since only those instructions that miss both in P-cache 320 and micro-TLB 340 will be recycled. Of course, by adding additional hardware, it can be conceived that AX-pipeline 328 may also initiate a miss-handler routine for micro-TLB 340 misses, removing the need for recycling instructions altogether.

Also associated with P-cache 320 is a history file 360. History file 360 maintains a record of previous activity for specific instructions. History file 360 is indexed by the program counter value for that specific instruction. History file 360 contains historical information about that instruction and previous accesses to the cache by that instruction. When AX-pipeline 328 operates on an instruction, the program counter value is placed on program counter lines 362. This value is compared with each line of history file 360 and if a match occurs, it is communicated on a history file hit line 364.

In FIG. 5, a specific embodiment of history file 360 is depicted. Each line of history file 360 contains several data fields that correspond to historical and other information relating to a particular software instruction. A valid bit in the first location indicates whether the data on the line is valid. That is, if the valid bit is set, the line associated with that bit is a valid entry; and, if the valid bit is not set, the data on that line is not valid.

The next entry is the PC (program_counter). The PC is typically the index by which history file 360 is referenced. Since each instruction in the software has a unique program counter value, this value will uniquely identify a particular software instruction. The next entry is load_EA. This is the effective physical address of the data that was referenced by the previous occurrence of the instruction associated with this line. For example, it may be the physical address of data that was last requested by that load instruction.

Another entry in the history file is the stride. The stride is used to record the difference in the data address of the memory location referenced by the instruction and the address referenced by the instruction in the previous iteration. For example, software often has loop instructions with a counter that is indexed by a certain amount each time. The counter may be incremented or decremented depending on the application. The address of memory references in the software instructions are often based on the counter. The amount by which the referenced address value changes each time is the stride. Stride is maintained because it is useful in determining what location that instruction is likely to reference on its next iteration. This allows the data to be prefetched, since the next address will likely be the previous address plus the stride. When there is a history file hit for a particular instruction, the physical address of the new instruction's data is compared with the load_EA value from the history buffer. The difference between the two numbers is recorded as the stride value.

Another entry in history file 360 may be a P-cache_line_valid bit. This bit is set when the data address associated with this instruction is in P-cache 320. If it is in P-cache 320, the next entry, P-cache_line_index, contains a pointer to the line in P-cache 320 that contains the data for this instruction. History file 360 also maintains a P-cache_line_hits entry that maintains a count of how many times this particular P-cache line has been referenced by this instruction or other instructions sharing the same P-cache line.

The next entry is the load_pc_hits entry. This entry maintains a count of how many times this program counter value (i.e., this instruction) has been referenced and caused a history file 360 hit. Another entry is a don't_steer entry. This is a single bit that is set to indicate to the steering logic not to steer an instruction to the P-cache. The steering logic will be described below. The don't_steer entry is especially useful when a load data address has been invalidated by a store instruction to that location, thereby invalidating the P-cache entry.

The final entry shown in FIG. 5 is the loop_size. This keeps track of how short the loop is, that is, how many instructions are in a particular loop. If a loop is too short, the prefetching cannot be accomplished fast enough and is of no use. Therefore, by accessing this information, the hardware can make better decisions on whether to prefetch for certain loop instructions.

Although a specific embodiment of history file 360 is described above and shown in FIG. 5, it will be recognized by one of skill in the art that there is other information that may be of value in determining whether or not to prefetch data. History file 360 will be understood to be a repository for such information. For example, a constant stride variable may keep track of whether the stride value is constant or whether it is changing each time. The details of history file 360 as described above are intended as an example and not as a limitation on the present invention.

Referring again to FIG. 3, two logic blocks, are depicted, a prefetch logic block (PLB) 370 and a steering logic block (SLB) 380. These may be combinational logic blocks. Prefetch logic block 370 determines when and what type of data to prefetch. Steering logic block 380 directs certain instructions to AX-pipeline 328 to be executed in parallel with instructions in MS-pipeline 324.

Prefetch logic block 370 interprets software commands, monitors history file 360, monitors P-cache 320 and D-cache 310, and monitors micro-TLB 340 to make decision on prefetching. Using this information, prefetch logic block 370 prefetches data for P-cache 320. In the specific embodiment, prefetch logic block 370 is configurable to operate in several modes. This allows the user to have control over the prefetching algorithm. This is valuable feature because different applications will often experience different results from certain prefetching techniques.

Although many different configuration modes may be envisioned, the specific embodiment implements the following modes:

static prefetch only;
   dynamic prefetch on micro-TLB 340 hit, D-cache 310 miss, and P-cache 320 miss;
   dynamic prefetch on micro-TLB 340 hit and P-cache 320 hit; and
   dynamic prefetch on micro-TLB 340 hit and history file 360 hit;
   dynamic prefetch with restrictions on constant stride, stride size, loop size, and store-invalidation.

The first mode that the prefetch logic block 370 operates in is static prefetch only. In this mode, data is only prefetched in P-cache 320 when specific software commands are issued. These commands are included in the software before run-time. The software instructions are typically generated by a compiler using the knowledge that it has of the software structure to make predications of when prefetching will be most effective. An advantage of this type of prefetching is that it is done with a knowledge of the software. Consequently, it can decide more efficiently when to prefetch. However, the extra instructions in the software add delay to the system. Prefetch logic block 370 monitors the instructions issued and when a prefetch instruction is detected, it loads the requested data into P-cache 320.

The second mode of prefetch is dynamic prefetching on any load that hits micro-TLB 340, but misses both D-cache 310 and P-cache 320. Dynamic prefetching is done by hardware during the operation of the system. Micro-TLB 340 is loaded based on similar criteria as is used to steer instructions to AX-pipeline 328. Therefore, if there is a micro-TLB hit, then there is a reasonable probability that the instruction is a recurring one. Consequently, the data that future iterations of the instruction will reference can be predicted, so there is an advantage to prefetching the data. However, this is a fairly aggressive mode and may make more mistakes than other modes. Nevertheless, it has the potential of bigger gains.

The third mode is dynamic prefetching on any load instruction that hits both micro-TLB 340 and P-cache 320 once or multiple times. The fourth mode is a dynamic prefetch load that hits both micro-TLB 340 and history file 360 once or multiple times. These modes are less aggressive and will be more likely to not generate unnecessary prefetch requests. The final mode is a dynamic prefetch with selected restrictions on the constant stride, stride size, loop size, and store invalidation. This information may be stored in history file 360. Essentially, this mode just adds additional restrictions to modes two, three, and four above. For example, the prefetching can be restricted to only those loads that have a stride size no greater than 64 bytes. Of course, besides these restrictions, one of skill in the art can readily envision other similar types of restrictions in the invention is intended to cover such modes also. In the present invention, prefetching is restricted to floating point load instructions only.

When prefetch logic block 470 detects the proper conditions according to the mode it is operating in, it sends a request to an external memory unit (i.e., L2 cache 150 or storage device 125) for the data. The request packet contains the physical address and appropriate attributes for obtaining the data such as the prefetch type, page size, etc. The prefetch address may be determined, for example, by adding the stride to the Load_EA value from history file 360. Other methods of determining the address will be apparent to one of skill in the art. In a static prefetch, the prefetch physical address is acquired from the machine assembly instruction.

The second logic block is steering logic block 380. Steering logic block 380 is responsible for directing certain load instructions to AX-pipeline 328, rather than MS-pipeline 324. This allows multiple loads to be issued per cycle. A consideration of steering logic block 380 is that it be as aggressive as possible so that the system operates efficiently. Yet, it should not steer bad loads (i.e., those that cause cache misses in micro-TLB 340.) In the specific embodiment, a micro-TLB 340 miss for an instruction in AX-pipeline 328 causes the instruction to be rerouted through MS-pipeline 324 to perform the address translation. This rerouting process can take a considerable number of delay cycles. Therefore, if there are relatively many bad steerings, AX-pipeline 328 can hurt performance rather than improve it. Of course, it can be envisioned by one of skill in the art that the addition of hardware and other techniques may remove this restriction.

When steering logic block 380 determines that an instruction is likely to be found in P-cache 320, it sets a "predicted P-cache steering" (pps) bit that is associated with each load instruction. This pps bit may be stored as an entry in history file 360. It may be combined in history file 360 with the previously described Don't_steer bit, or it may be a separate entry. It may also be stored in a separate instruction-cache (Not shown.) If the bit is set, then the next time the instruction is executed, it is automatically directed to AX-pipeline 328 rather than MS-pipeline 324. In the specific embodiment, the pps bit is reset when an instruction causes a P-cache 320 miss.

To give the user as much flexibility as possible on when to steer instructions, various steering algorithms can be programmably selected to determine when to set the pps bit for a particular load instruction. The user may select which algorithm to use based on different modes that are available for steering logic block 380. In the specific embodiment, only floating point load instructions are steered to AX-pipeline 328. Floating point instructions are more likely to be repetitive in nature and are therefore good candidates for prefetching. Nevertheless, other types of instructions may also be steered to AX-pipeline 328 in the spirit of the present invention.

Although other modes may be easily envisioned, the following situations are implemented in the specific embodiment as times when a floating point load instruction may be directed to AX-pipeline 328, rather than MS-pipeline 324.

load instruction hits P-cache 320 for the nth time;
history file 360 hit for the nth time;
miss to D-cache 310 on an instruction in MS-pipeline pipe 324;
unused resources in AX-pipeline 328;
stride pattern is consistent;
store-invalidation for P-cache line.

The first situation in which an instruction is to be steered to AX-pipeline 328 is whenever the load instruction hits P-cache 320 for the nth time, where n is greater than zero. In the specific embodiment n is set to one. This causes the pps bit to be set on the first time a P-cache 320 hit occurs, and thereafter when the load instruction is encountered it is steered to AX-pipeline 328. This will happen, for example, the second time through any loop. During the first occurrence of the load instruction, MS-pipeline 328 loads micro-TLB 340 with the address translation so it will be available when the instruction is directed to AX-pipeline 328 on the next iteration.

The second steering situation is when an instruction causes a hit to history file 360 for the nth time where n is greater than zero. In the specific embodiment n is one. This directs instructions to the AX-pipeline when there is historical information from which prefetching addresses can be determined. Third, when the instruction is in MS-pipeline 324 and a miss to D-cache 310 occurs, the instruction is steered to AX-pipeline 328. Fourth, when the current instruction group has unused resources in AX-pipeline 328, instructions can be given to the AX-pipeline 328 to more efficiently use the resources. Fifth, when the stride pattern is consistent, the next address in the stride pattern may be prefetched since it is likely to be in a constant loop. Sixth, when a P-cache line has been invalidated because of a store instruction, prefetching for that line is restricted since the data may no longer be valid. Therefore, instructions referencing that data are not steered.

In the specific embodiment, the user can selectively choose different modes of operation using different combinations of these six situations. One of skill in the art can determine mode will be most efficient, depending upon the application being run.

Although a specific example of an implementation of the present invention has been described, it will be recognized that variations may be made that do not detract from the spirit or scope of the invention described. For example, multiple processors may be used instead of the single processor described. The caches may be on a network instead of on the same chip as the processor. There may be more than one P-cache 320, D-cache 310, or AX-pipelines 328. Furthermore, instructions other than floating point load instructions may be steered to AX-pipeline 328. The figures and descriptions above are merely to aid in understanding the invention, and the invention is to be limited only by the metes and bounds of the attached claims.

What is claimed is:

1. A data cache system comprising:
   a processor;
   first and second cache memories, the first and second cache memories coupled to the processor;
   first and second translation lookaside buffers coupled to the first and second cache memories, respectively, wherein the first translation lookaside buffer provides an address translation to the first cache memory and the second translation buffer provides an address translation to the second cache memory;
   a first execution unit coupled to the first cache memory, the second cache memory and the first translation lookaside buffer;
   a second execution unit coupled to the second cache memory and the second translation lookaside buffer; and
   a prefetch logic block that selectively causes data to be loaded into the second cache memory prior to the data being referenced by a memory instruction.

2. The data cache system of claim 1 wherein the prefetch logic block loads said data based on detection of a hit to the second cache.

3. The data cache system of claim 1 wherein the prefetch logic block selects when to load said data based on detection of a hit to the second translation lookaside buffer.

4. The data cache system of claim 1 wherein the prefetch logic block has a plurality of selectable operating modes, whereby a user can select when and what type of data to prefetch into the second cache memory.

5. The data cache system of claim 1 wherein the prefetch logic block causes data to be loaded into the second cache memory when a memory instruction causes a hit to the second translation lookaside buffer.

6. The data cache system of claim 1, further comprising a steering logic block, the steering logic block selectively routing memory instructions to the second execution unit.

7. The data cache system of claim 6 wherein the steering logic block has a plurality of selectable operating modes, whereby a user can select when memory instructions are routed to the second execution unit.

8. The data cache system of claim 6 wherein the steering logic block only steers floating point load instructions to the second execution unit.

9. The data cache system of claim 1, further comprising a history file for storing historical information related to memory instructions.

10. The data cache system of claim 9 wherein the history file contains a stride value for predicting an address of data to prefetch.

11. The data cache system of claim 9 further comprising a steering logic block for selectively providing memory requests to the second execution unit based on the information contained in the history file.

12. The data cache system of claim 1 wherein the second translation lookaside buffer is loaded with information from the first translation lookaside buffer.

13. The data cache system of claim 1 wherein the second translation lookaside buffer is loaded in anticipation of the memory instruction being steered to the second execution unit.

14. The data cache system of claim 13 wherein the address translation is a physical address corresponding to a virtual address requested by a memory instruction.

15. A digital system comprising;
a memory system;
a bus coupled to the memory system;
a processor coupled to the bus; and
a data cache system coupled to the processor comprising:
first and second cache memories;
first and second translation lookaside buffers coupled to the first and second cache memories, respectively, wherein the first translation lookaside buffer provides an address translation to the first cache memory and the second translation buffer provides an address translation to the second cache memory;
a first execution unit coupled to the first cache memory, the second cache memory and the first translation lookaside buffer;
a second execution unit coupled to the second cache memory and the second translation lookaside buffer; and
a prefetch logic block that selectively causes data to be loaded into the second cache memory prior to the data being referenced by a memory instruction.

16. A data cache system comprising:
first and second cache memories;
first and second translation lookaside buffers;
a history file for storing historical information related to memory instructions;
a first execution unit coupled to the first and second cache memories and the first translation lookaside buffer; and
a second execution unit coupled to the second cache memory and the second translation lookaside buffer;
a prefetch logic block for selectively loading data in the second cache memory prior to the data being referenced by a memory instruction; and
a steering logic block for selectively steering the memory instruction to the second execution unit.

17. The data cache system of claim 16 wherein the prefetch logic block loads data into the second cache memory based on the information in the history file.

18. The data cache system of claim 16 wherein the prefetch logic block loads data in the second cache memory based upon a detection of a hit to the second translation lookahead buffer.

19. The data cache system of claim 16 wherein the prefetch logic block loads data in the second cache memory based upon a detection of a hit to the second cache memory.

20. The data cache system of claim 16 wherein the steering logic block steers memory instructions to the second execution unit based on the information in the history file.

21. A data cache system comprising:
a cache memory;
a prefetch cache memory;
a first execution pipeline coupled to the cache memory and the prefetch cache memory;
a second execution pipeline coupled the prefetch cache memory; and
a steering logic block coupled to the first execution pipeline and the second execution pipeline,
wherein the steering logic block provides instructions to either the first execution pipeline or the second execution pipeline.

22. The data cache system of claim 21 wherein the steering logic block provides floating point instructions to the second execution pipeline.

23. The data cache system of claim 21 further comprising:
a history file coupled to the steering logic block and comprising a number of entries,
wherein the steering logic block provides instructions to the second execution pipeline based on the entries in the history file.

24. The data cache system of claim 21 further comprising:
a prefetch logic block coupled to the cache memory and the prefetch cache memory,
wherein the prefetch logic block determines which data from a higher level memory should be stored in the prefetch cache.

25. The data cache system of claim 24 further comprising:
a history file coupled to the steering block and the prefetch logic block and comprising a number of entries,
wherein the prefetch logic block determines which data from a higher level memory should be stored in the prefetch cache memory based on the entries in the history file.

26. The data cache system of claim 21 further comprising:
a first transition lookaside buffer coupled to the cache memory and the first execution pipeline; and
a second transition lookaside buffer coupled to the prefetch cache memory and the second execution pipeline.

27. A data cache system comprising:
a steering logic block configured to receive instructions, and further configured to determine if a first criteria is met for each instruction, to provide the instruction at a second port if the first criteria is met, and otherwise to provide the instruction to a first port;
a first instruction pipeline configured to receive instructions from the first port of the steering logic block;
a second instruction pipeline configured to receive instruction from the second port of the steering logic block;

a data cache memory configured to receive addresses from the first instruction pipeline; and a prefetch cache memory configured to receive addresses from the first instruction pipeline and the second instruction pipeline.

28. The data cache system of claim 27 further comprising:

a prefetch logic block configured to receive a cache hit signal from the data cache memory and a prefetch cache hit signal from the prefetch cache memory.

29. The data cache system of claim 27 further comprising:

a user configurable prefetch logic block configured to write data to the prefetch cache memory, wherein the user may define select a condition when the prefetch logic block writes data to the prefetch cache memory.

30. The data cache system of claim 27 further comprising a history file configured to store entries regarding instructions received by the second instruction pipeline, and further configured to provide the criteria to the steering logic block.

31. The data cache system of claim 30 wherein the criteria is whether an instruction has been received by the second instruction pipeline a first number of times.

32. A method of retrieving data from a cache system comprising:

receiving instructions using a steering logic block;

for each instruction, determining if a criteria is met, and providing the instruction to a second execution pipeline if the criteria is met, else providing the instruction to a first execution pipeline;

receiving addresses from the first execution pipeline using a cache memory; and receiving addresses from the first execution pipeline and the second execution pipeline using a prefetch cache memory.

33. The method of claim 32 further comprising:

maintaining a history file; and using the history file to determine if the criteria is met.

34. The method of claim 32 further comprising:

receiving addresses from the first execution pipeline and providing physical addresses to the cache memory using a first translation lookaside buffer; and receiving addresses from the second execution pipeline and providing physical addresses to the prefetch cache memory using a second translation lookaside buffer.

* * * * *